US008718359B2

(12) United States Patent  
Sakai et al.

(10) Patent No.: US 8,718,359 B2  
(45) Date of Patent: May 6, 2014

(54) IMAGE PROCESSING APPARATUS AND METHOD FOR CONTROLLING THE APPARATUS

(75) Inventors: Hiroyuki Sakai, Chigasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 968 days.

(21) Appl. No.: 12/728,570

(22) Filed: Mar. 22, 2010

(65) Prior Publication Data

US 2010/0260415 A1  Oct. 14, 2010

(30) Foreign Application Priority Data

Apr. 14, 2009 (JP) ................................. 2009-098489

(51) Int. Cl.
*G06K 9/00* (2006.01)
*G06K 9/40* (2006.01)

(52) U.S. Cl.
USPC .......................................... 382/162; 382/254

(58) Field of Classification Search
None
See application file for complete search history.

(56) References Cited

U.S. PATENT DOCUMENTS

| 4,972,223 | A * | 11/1990 | Kaneko et al. | 396/239 |
|---|---|---|---|---|
| 6,694,051 | B1 * | 2/2004 | Yamazoe et al. | 382/167 |
| 7,010,160 | B1 | 3/2006 | Yoshida | 382/162 |
| 7,167,597 | B2 * | 1/2007 | Matsushima | 382/274 |
| 7,242,800 | B2 * | 7/2007 | Iguchi et al. | 382/167 |
| 7,315,657 | B2 * | 1/2008 | Matsushima | 382/274 |
| 7,362,370 | B2 * | 4/2008 | Sakamoto et al. | 348/371 |
| 7,369,163 | B2 * | 5/2008 | Akiyama et al. | 348/231.3 |
| 7,853,078 | B2 * | 12/2010 | Fujii | 382/167 |
| 8,035,727 | B2 * | 10/2011 | Okamoto | 348/362 |
| 8,213,733 | B2 * | 7/2012 | Kato et al. | 382/254 |
| 8,363,125 | B2 * | 1/2013 | Miyagi | 348/234 |
| 2003/0099407 | A1 * | 5/2003 | Matsushima | 382/274 |
| 2003/0174886 | A1 * | 9/2003 | Iguchi et al. | 382/167 |
| 2003/0179298 | A1 * | 9/2003 | Akiyama et al. | 348/222.1 |
| 2007/0041637 | A1 * | 2/2007 | Matsushima | 382/169 |
| 2008/0253684 | A1 * | 10/2008 | Watanabe | 382/276 |
| 2009/0034837 | A1 * | 2/2009 | Kato et al. | 382/167 |
| 2009/0034840 | A1 * | 2/2009 | Umeda et al. | 382/168 |
| 2009/0041347 | A1 * | 2/2009 | Iguchi et al. | 382/167 |
| 2009/0231630 | A1 | 9/2009 | Sakai | 358/3.28 |

FOREIGN PATENT DOCUMENTS

| JP | 2002232728 A | 8/2002 |
|---|---|---|
| JP | 2002-369075 A | 12/2002 |
| JP | 2007-228221 | 9/2007 |
| JP | 4057147 | 3/2008 |
| JP | 2008244769 A | 10/2008 |
| JP | 2009038523 | * 2/2009 |

* cited by examiner

*Primary Examiner* — Manav Seth
(74) *Attorney, Agent, or Firm* — Fitzpatrick, Cella, Harper & Scinto

(57) ABSTRACT

An image processing apparatus and a method thereof for correcting image data in accordance with a feature of the image data, calculates a brightness component of image data and a color difference component of image data, determines whether the image data is a nightscape image or an underexposed image using the calculated brightness component and color difference component, and corrects the image data which has been determined as a nightscape image or an underexposed image.

14 Claims, 10 Drawing Sheets

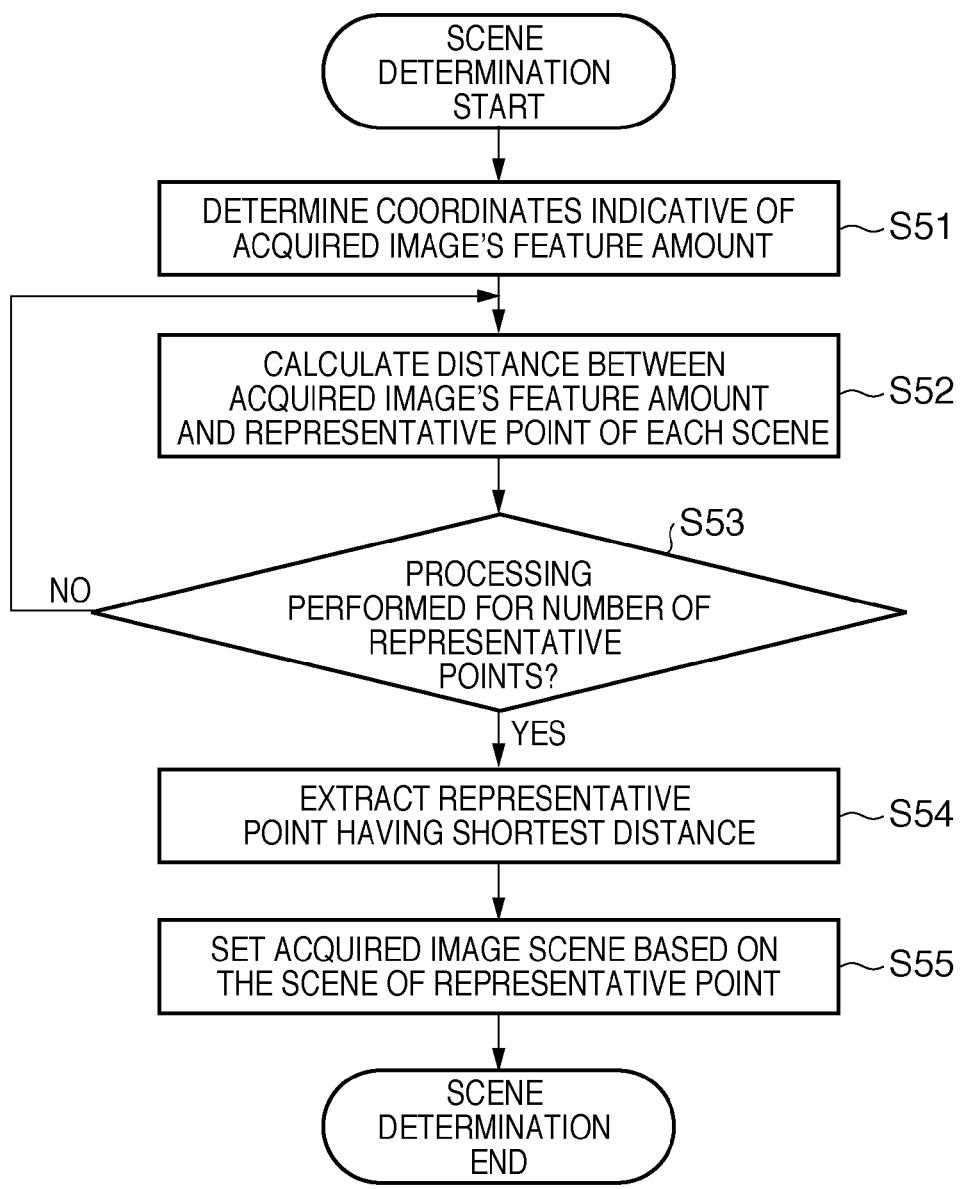

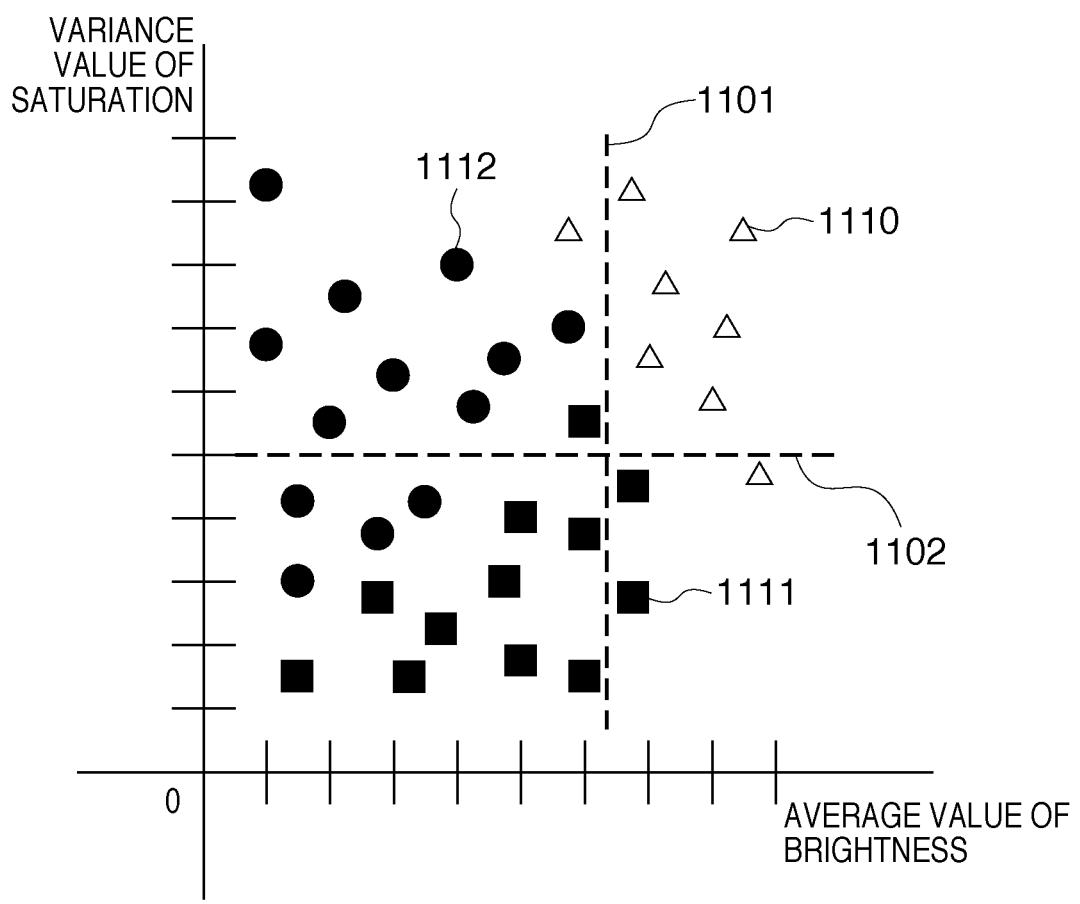

IMAGE PROCESSING APPARATUS AND METHOD FOR CONTROLLING THE APPARATUS

BACKGROUND OF THE INVENTION

1. Field of the Invention

The present invention relates to an image processing apparatus and a method for controlling the apparatus, which corrects image data in accordance with a feature of the image data.

2. Description of the Related Art

Recently, digital cameras which record still images, sensed by image sensors, as digital data have widely been used. Along with an increased capacity of a memory card for recording images, storing a massive amount of photographed images has become a common practice. Since photographing and storing a massive amount of images has become easy, more images are photographed and stored casually with an inappropriate exposure amount. For instance, if an image is photographed with an underexposure state, the entire image turns out to be dark even if the photographed location is light. If the image, photographed with an underexposure state and stored, is to be displayed on a computer screen or printed out for viewing, it is preferable that appropriate correction be performed on the photographed image for compensating the overs and shorts of the exposure at the time of photography. Since it is extremely troublesome to manually perform such correction one by one on the massive amount of images, it is desirable that the overexposure or underexposure state of photographed images be automatically determined and correction be performed. However, it is difficult to automatically discriminate, for instance, an underexposed image from a nightscape image which is dark as a whole. In order to solve such problems, methods have been proposed for automatically discriminating an underexposed image from a nightscape image and executing appropriate correction.

Japanese Patent Application Laid-Open No. 2007-228221 (D1) discloses a method for determining a photographed scene and correcting a correction processing condition, which has been set based on the scene determination, in accordance with a night-scene index. The night-scene index described in D1 is calculated using the photograph conditions at the time of photography, skin color pixel information of the image, and average luminance of the entire image. The method according to D1 determines the scene of the photographed image, thereby automatically setting the correction condition. Further, by performing correction while taking night scene photography into consideration, an appropriately corrected image is acquired. However, in a case of determining a scene of a photographed image, if no photograph conditions are set at the time of photography or the setting conditions are replaced, scene determination cannot sufficiently be performed.

Further, Japanese Patent No. 04057147 (D2) discloses a backlit scene determination method that can judge whether or not a photographed image is a scene with backlight, without making errors even if the photographed image includes a dark portion other than the main object. In this method according to D2, it is not determined whether the image is a nightscape image or an underexposure landscape image having low brightness. For instance, in a nightscape, if the background is dark but part of the scene is lit by illumination, the illuminated part is judged not as a backlit scene. Moreover, if the dark part has low brightness and low saturation variance, it is wrongly determined as a backlit scene; therefore, the dark part of the nightscape is determined as a backlit scene. In this manner, if the dark part of the nightscape is wrongly determined as a backlit scene, it is undesirably corrected to a lighter image.

FIG. 10 depicts an image view in which image data are plotted in two-dimensional feature-amount space, having saturation variance values on the ordinate and average brightness values on the abscissa.

In FIG. 10, numeral 1110 (triangle) denotes a landscape image having an appropriate exposure; numeral 1111 (black square) denotes an underexposure landscape image; and numeral 1112 (black circle) denotes a nightscape image. Each shows an image in which brightness average values and saturation variance values are respectively plotted on the feature-amount space. The landscape image 1110 with an appropriate exposure has a high brightness average value and a high saturation variance value. The underexposure landscape image 1111 has a low brightness average value and a low saturation variance value. The nightscape image 1112 has a low brightness average value.

According to D2, in a case of determining whether or not a photographed image is a backlit scene, an image having, for example, a value less than or equal to the threshold value 1102 on the ordinate and a value less than or equal to the threshold value 1101 on the abscissa is determined as a backlit scene. However, both underexposed image and nightscape image are included in the area less than or equal to the threshold value 1102 on the ordinate and the threshold value 1101 on the abscissa. Therefore, it is impossible to discriminate, only with two threshold values, whether an image is an underexposed image or a nightscape image. Accordingly, determining a backlit scene cannot sufficiently be realized by the scene determination method in which a threshold value is set for each of the feature amounts.

SUMMARY OF THE INVENTION

An aspect of the present invention is to eliminate the above-mentioned problems with the conventional technology.

The present invention is characterized by discriminating at least underexposed image data from nightscape image data, and performing image correction in accordance with the discriminated image data.

According to an aspect of the present invention, there is provided an image processing apparatus comprising:
a calculation unit configured to calculate a brightness component and a color difference component of image data;
a determination unit configured to determine whether the image data is a nightscape image or an underexposed image, using the brightness component and the color difference component calculated by the calculation unit; and
a correction unit configured to correct the image data which has been determined as the nightscape image or the underexposed image by the determination unit.

According to another aspect of the present invention, there is provided a method for controlling an image processing apparatus, comprising the steps of:
calculating a brightness component and a color difference component of image data;
determining whether the image data is a nightscape image or an underexposed image, using the brightness component and the color difference component calculated in the calculating step; and
correcting the image data which has been determined as a nightscape image or an underexposed image in the determining step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart describing an operation procedure of a scene determination unit according to the embodiment of the present invention;

FIG. 10 depicts a view in which image data are plotted in two-dimensional feature-amount space.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

The present embodiment takes, as an example, an image processing system having an image processing apparatus for analyzing digital image data and determining a scene.

Hereinafter, an overall image processing system according to the embodiment of the present invention is described with reference to the drawings.

Figure 1:
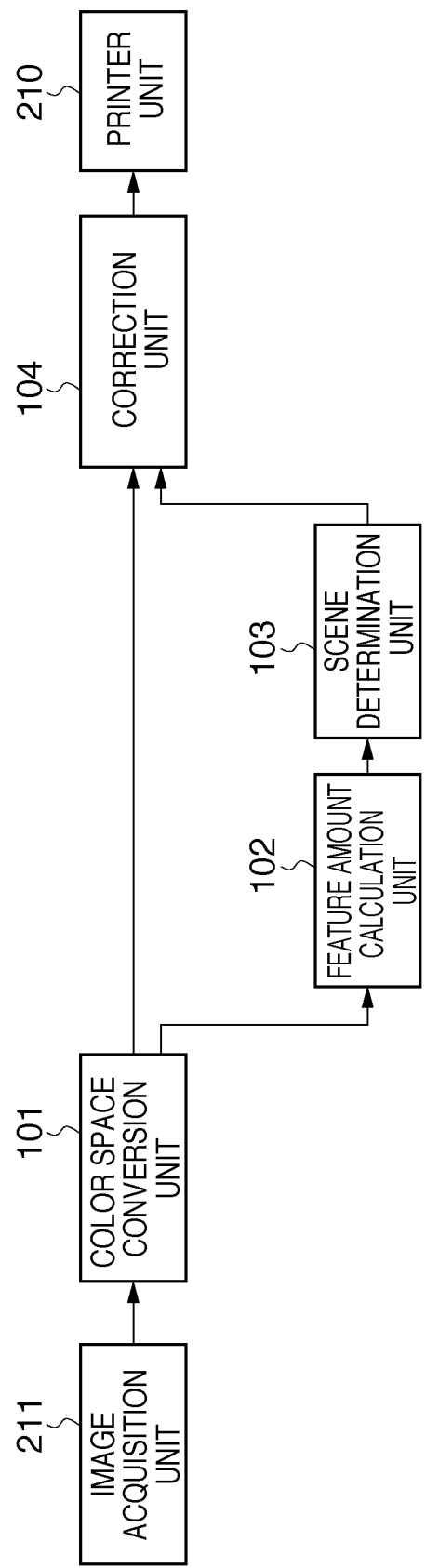
FIG. 1 is a block diagram describing a functional configuration of an image processing system according to an embodiment of the present invention.

FIG. 1 is a block diagram describing a functional configuration of an image processing system according to the embodiment of the present invention.

The image processing system comprises: an image acquisition unit 211, a color space conversion unit 101, a feature amount calculation unit 102, a scene determination unit 103, a correction unit 104, and a printer unit 210.

The image acquisition unit 211 is an image sensing apparatus, for example, a digital camera, in which sensed images are stored as digital image data in a recording medium such as a memory card. It may also be a scanner which reads an original image and acquires an image file as digital image data. Alternatively, it may also be an apparatus which acquires an image file from the digital camera, scanner or the like. The color space conversion unit 101 converts input digital image data, input from the image acquisition unit 211, to a color space that is necessary for the feature amount calculation unit 102, and transmits the color-space-converted image data to the feature amount calculation unit 102. Further, the color space conversion unit 101 converts digital image data, input from the image acquisition unit 211, to a color space that is necessary for the correction unit 104, and transmits the color-space-converted image data to the correction unit 104. The feature amount calculation unit 102 calculates a feature amount indicative of brightness component and a feature amount indicative of color variance component based on the image data which has been color-space-converted by the color space conversion unit 101. The scene determination unit 103 calculates a distance between a value having a combination of feature amounts calculated by the feature amount calculation unit 102 and a representative value having a combination of a plurality of feature amounts indicative of each scene set in advance. Among the calculated distances between the value and representative values, the scene indicating the representative value of the shortest distance is decided to be the scene of the acquired image. The correction unit 104 performs tone correction in accordance with the scene determined by the scene determination unit 103. The printer unit 210 prints an image, corrected by the correction unit 104, on a print medium.

Figure 2:
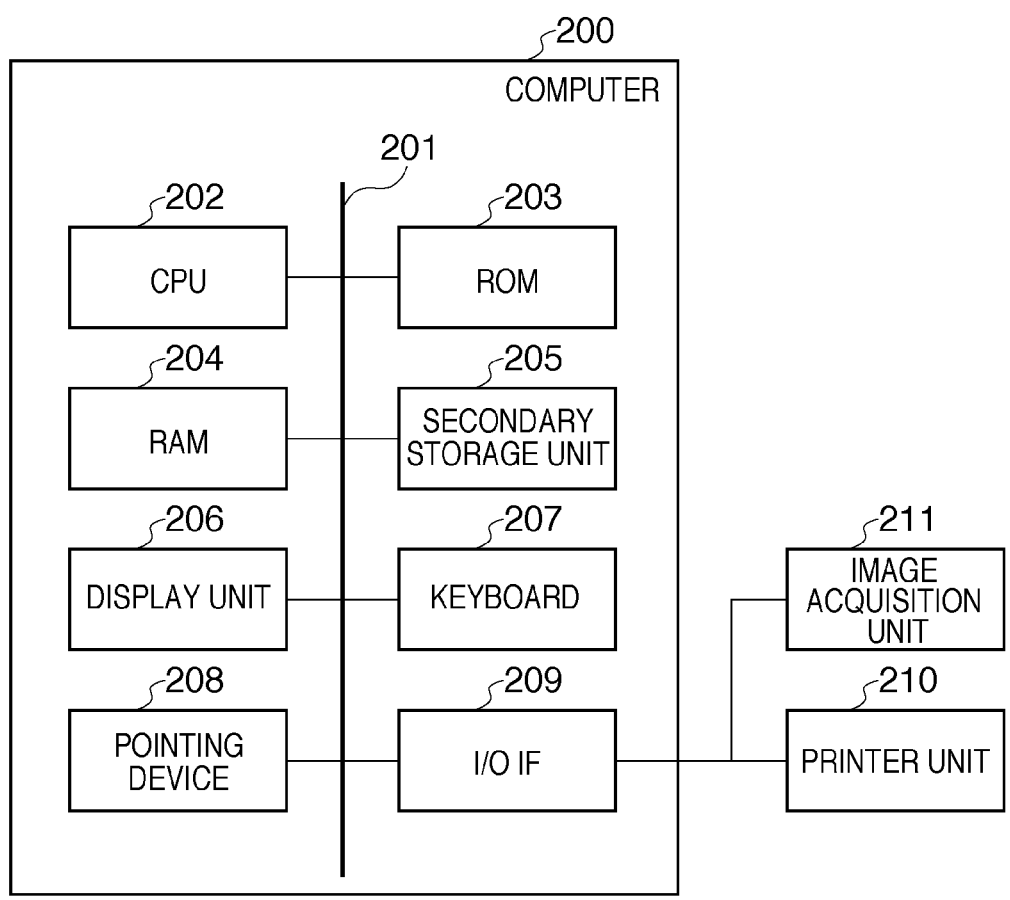
FIG. 2 is a block diagram describing a configuration of an image processing system according to an embodiment of the present invention.

FIG. 2 is a block diagram describing a configuration of the image processing system according to the embodiment of the present invention.

The image processing system comprises a computer 200, and the printer unit 210 and image acquisition unit 211 (e.g., digital camera or scanner) which are connected to the computer 200. In the computer 200, a CPU 202, ROM 203, RAM 204, and a secondary storage unit 205 such as a hard disk are connected to a system bus 201. For a user interface, a display unit 206, a keyboard 207, and a pointing device 208 or the like are connected to the CPU 202. Furthermore, the printer unit 210 for image printing is connected through an I/O interface 209. Moreover, the image acquisition unit 211 for inputting image data is connected through the I/O interface 209. When an instruction is received to execute an application (having a function for executing the control which will be described below), the CPU 202 reads the corresponding program that has been installed in the secondary storage unit 205 and loads the program in the RAM 204. Thereafter, by activating the program, the given application can be executed. By this control, the processing of the color space conversion unit 101, feature amount calculation unit 102, scene determination unit 103, and correction unit 104 shown in FIG. 1 are executed.

Figure 3:
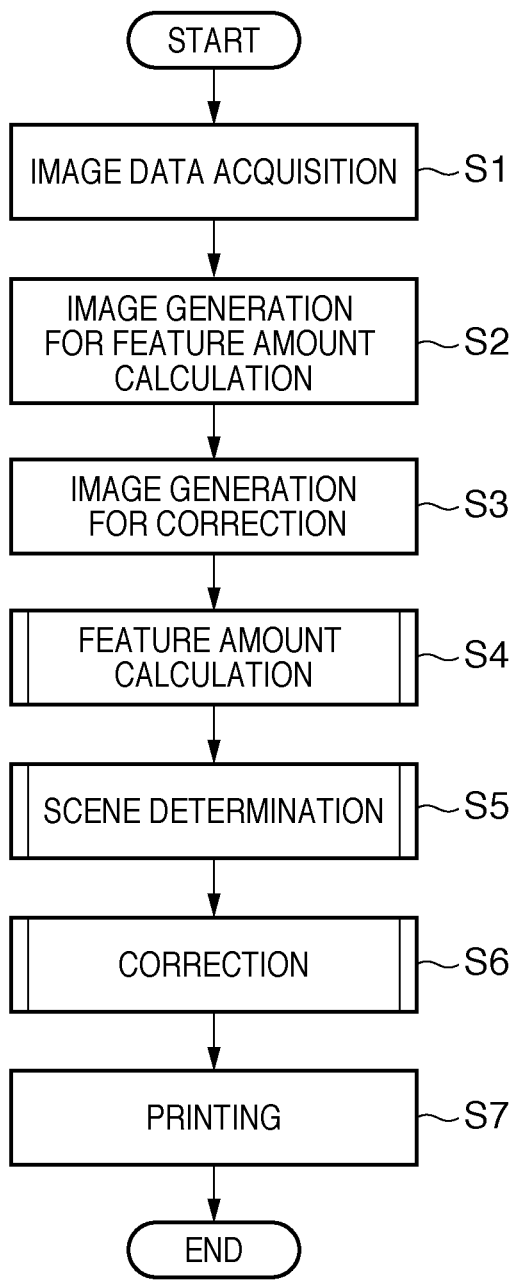
FIG. 3 is a flowchart describing a computer operation according to the embodiment of the present invention.

FIG. 3 is a flowchart describing an operation procedure of the computer 200 in the image processing system according to the embodiment of the present invention. The program which executes this control is loaded from the secondary storage unit 205 to the RAM 204 upon execution, and is executed under the control of the CPU 202.

First, in Step S1, a file including digital image data is acquired from the image acquisition unit 211. Then, image data and auxiliary data of the image data, for example, image size, are obtained from the acquired file, and transmitted to the color space conversion unit 101. If the acquired file is, for instance, compressed image data in a JPEG (Joint Photograph Experts Group) format or the like, image data decompression is performed. JPEG is a still image compression method for compressing photographed image data. Next, in Step S2, the acquired image data is converted by the color space conversion unit 101 to the color space necessary for the feature amount calculation unit 102, and transmitted to the feature amount calculation unit 102. In Step S3, the acquired image data is converted by the color space conversion unit 101 to the color space necessary for the correction unit 104, and transmitted to the correction unit 104. In this color conversion, publicly known color conversion method is performed. For instance, assuming that the color space of the image data input to the color space conversion unit 101 is RGB and the color space necessary for the feature amount calculation unit 102 is YCbCr, color conversion is performed using the following conversion equation defined in the ITU-Recommendation BT.601.

$$Y=0.299 \times R+0.587 \times G+0.144 \times B$$

$$Cb=-0.169 \times R-0.331 \times G+0.500 \times B$$

$$Cr=0.500 \times R-0.419 \times G-0.081 \times B$$

Next, in Step S4, the feature amount calculation unit 102 analyzes the color-space-converted image data, calculates a feature amount indicative of brightness component and a feature amount indicative of color variance component, and transmits the feature amounts to the scene determination unit 103. For instance, based on the YCbCr color-space image data, an average value of luminance (Y) is calculated as a brightness component. For a color variance component, a variance value of color difference (Cb) is calculated. These are obtained as the feature amounts.

An average value of luminance (Y) is calculated using the following conversion equation.

$$\text{Luminance }(Y)\text{ average value}=\Sigma\{(\text{luminance value }(Y))\times(\text{frequency})\}/(\text{number of all pixels})$$

Using the following conversion equation, an average value of color difference (Cb) is calculated, and thereafter a variance value of color difference is calculated.

$$\text{Color difference }(Cb)\text{ average value}=\Sigma\{(\text{color difference value }(Cb))\times(\text{frequency})\}/(\text{number of all pixels})$$

$$\text{Color difference }(Cb)\text{ variance value}=\Sigma\{(\text{color difference value }(Cb))-(\text{color difference average value})\}^2/(\text{number of all pixels})$$

In the above equations, $\Sigma$ indicates the summation of 0 to 255.

Next in Step S5, the scene determination unit 103 calculates a distance between a value having the combination of feature amounts calculated by the feature amount calculation unit 102 and a representative value having a combination of a plurality of feature amounts indicative of each scene set in advance. Among the calculated distances between the value and representative values, the scene indicating the representative value of the shortest distance is decided to be the scene of the input image data. For instance, for a feature amount indicative of brightness component, an average value of luminance (Y) is obtained, and for a feature amount indicative of color variance component, a variance value of color difference (Cb) is obtained. For a plurality of feature amounts indicative of each scene set in advance, similarly an average value of luminance (Y) is obtained as a feature amount indicative of brightness component, and a variance value of color difference (Cb) is obtained as a feature amount indicative of color variance component. Assume that the scenes set in advance are two scenes: a nightscape and an underexposed image. For a nightscape, three representative values are stored. Three combinations of feature amounts, including a luminance (Y) average value and a color difference (Cb) variance value, are set. Meanwhile, for an underexposed image, four representative values are stored. Four combinations of feature amounts, including a luminance (Y) average value and a color difference (Cb) variance value, are set. A difference is calculated between the value having the combination of feature amounts calculated based on the input image data and each of these seven representative values. A representative value having the smallest difference among the seven feature amounts is obtained. The scene set in advance for the representative value of the smallest difference is decided to be the scene of the input image data.

Next, in Step S6, The correction unit 104 performs correction in accordance with the scene determined by the scene determination unit 103. For instance, depending on whether the determined scene is a nightscape image or an underexposed image, different tone correction are performed. For instance, if the determined scene is a nightscape, correction is performed to make the dark part darker and the light part lighter, without letting the corrected luminance average value exceed the original luminance average value. If the determined scene is an underexposed image, correction is performed to make the entire image lighter so that the corrected luminance average value exceeds the original luminance average value. Next, in Step S7, the image data corrected by the correction unit 104 is output to the printer unit 210 for printing. For instance, the printer unit 210 prints the corrected image data that is converted to print data corresponding to CMYK ink colors to form an image on a sheet.

Figure 4:
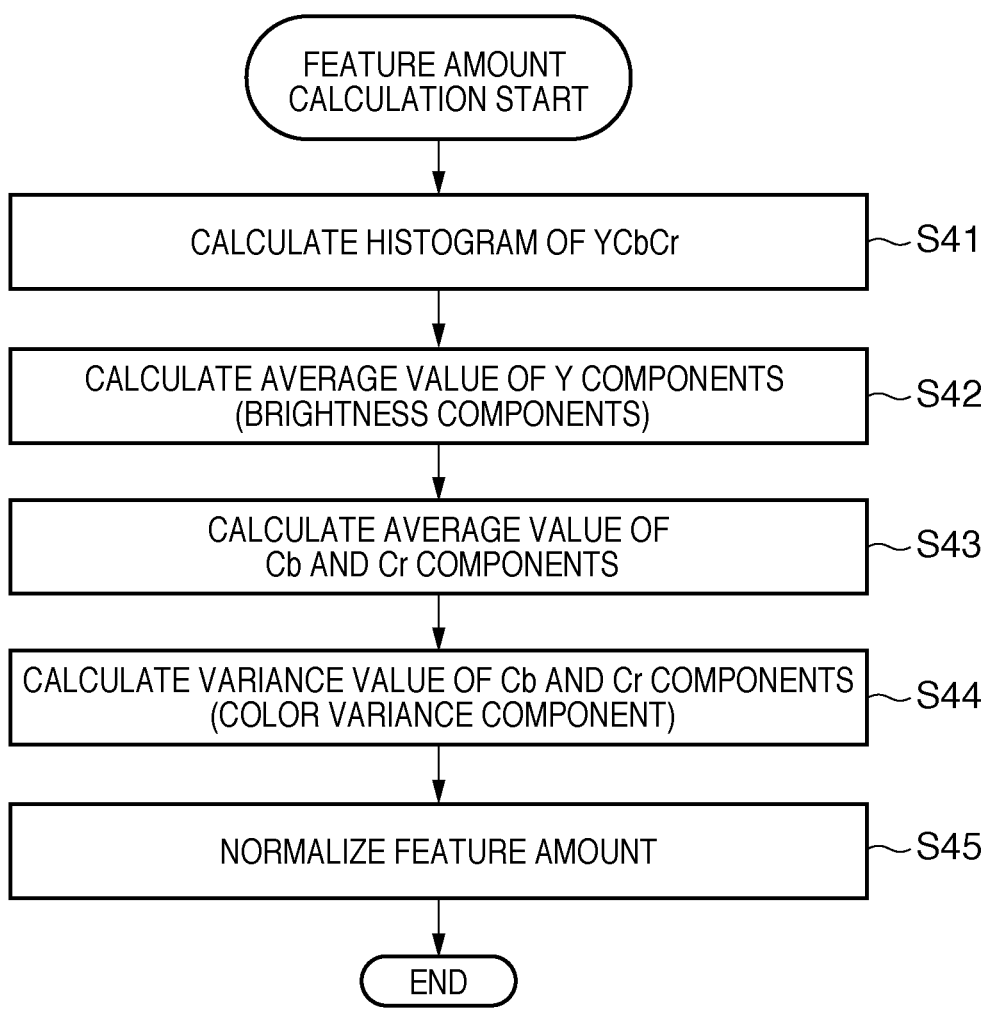
FIG. 4 is a flowchart describing an operation procedure of a feature amount calculation unit according to the embodiment of the present invention.

FIG. 4 is a flowchart describing a procedure of the feature amount calculation unit 102 according to the embodiment of the present invention.

Figure 5A:
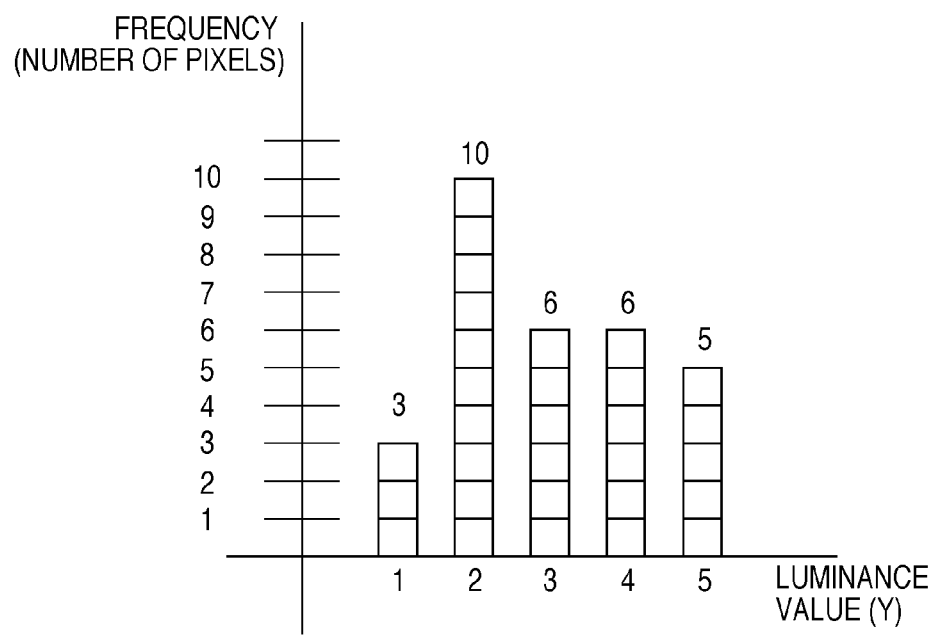
FIGS. 5A and 5B are graphs showing an example of histograms of luminance (Y) and color difference (Cb)
Figure 5B:
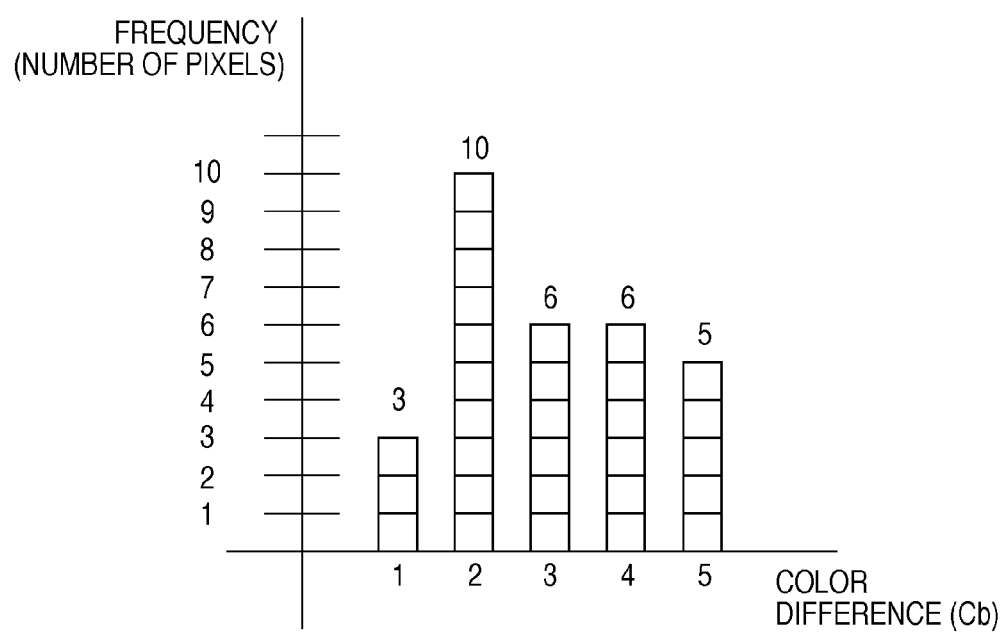

FIG. 5A is a graph showing a histogram of luminance (Y) according to the embodiment, and FIG. 5B is a graph showing a histogram of color difference (Cb) according to the embodiment.

For instance, assume that the image data input to the color space conversion unit 101 is image data having YCbCr color space. Also assume that the feature amount indicative of brightness component is calculated as an average value of luminance (Y), and the feature amount indicative of color variance component is calculated as a variance value of color difference (Cb).

Referring to the flowchart in FIG. 4, first in Step S41, a histogram of the YCbCr image data is calculated. In Step S42, an average value of Y, which is a brightness component, is calculated from the obtained histogram. An average value of luminance (Y) is obtained by the following equation.

$$\text{Luminance }(Y)\text{ average value}=\Sigma\{(\text{luminance value }(Y))\times(\text{frequency})\}/(\text{number of all pixels})$$

Herein, $\Sigma$ indicates the summation of 0 to 255.

Assuming herein that the luminance (Y) is expressed by the histogram shown in FIG. 5A, an average value of luminance (Y) is 3.

$$\text{Luminance }(Y)\text{ average value}=\{(1\times3)+(2\times10)+(3\times6)+(4\times6)+(5\times5)\}/(3+10+6+6+5)=90/30=3$$

Next in Step S43, an average value of color difference Cb is calculated based on the obtained histogram.

An average value of color difference (Cb) is obtained by the following equation.

$$\text{Color difference }(Cb)\text{ average value}=\Sigma\{(\text{color difference value }(Cb))\times(\text{frequency})\}/(\text{number of all pixels})$$

Herein, $\Sigma$ indicates the summation of 0 to 255.

Assuming herein that the color difference (Cb) is expressed by the histogram shown in FIG. 5B, an average value of color difference (Cb) is 3.

Next, in Step S44, a variance value of color difference Cb, which is the color variance component, is calculated from the obtained histogram.

A variance value of color difference (Cb) is obtained by the following equation.

Color difference (Cb) variance value=Σ{(color difference value (Cb))−(color difference average value)}²/(number of all pixels)

Herein, Σ indicates the summation of 0 to 255.

Since the color difference (Cb) is expressed by the histogram shown in FIG. 5B, the variance value of Cb is 1.6.

Color difference (Cb) average value={(1×3)+(2×10)+ (3×6)+(4×6)+(5×5)}/(3+10+6+6+5)=90/30=3

Color difference (Cb) variance value={(1−3)²×3}+ ((2−3)²×10)+(3−3)}²×6)+((4−3)²×6)+((5−3)²×5) }/(3+10+6+6+5)=48/30=1.6

Next, in Step S45, the feature amount indicative of the brightness component and the feature amount indicative of the color variance component calculated in Step S42 and S44 are normalized to values 0 to 100. For instance, in normalization, if an assumed range of the luminance (Y) average value which is the brightness component is 0 to 255, values 0 to 255 are converted to values 0 to 100.

normalized value of luminance (Y) average value= (luminance (Y) average value)/255)×100

Furthermore, for normalizing the variance value of color difference (Cb), values 0 to 16384 are converted to values 0 to 100, and values larger than 16384 are converted to 100.

normalized value of color difference (Cb) variance value={color difference (Cb) variance value/ 16384}×100

The feature amount calculation unit 102 outputs the normalized value of the feature amount indicative of the brightness component and the normalized value of the feature amount indicative of the color variance component to the scene determination unit 103.

In the present embodiment, although an average value of luminance (Y) is given as an example of the feature amount indicative of brightness component, it is not limited to this as long as the feature amount indicates a brightness component. For instance, a maximum value, minimum value, or median value of luminance (Y) may be used as the feature amount indicative of brightness component. Moreover, for a feature amount indicative of brightness component, calculation of the feature amount may be performed within a certain region. For instance, assuming that the luminance (Y) has density values ranging from 0 to 255, an average value of luminance (Y) may be calculated excluding the density values 0 and 255. Alternatively, an average value of luminance (Y) may be calculated within a density range equivalent to 0%-5% of the number of entire pixels from the maximum value of luminance (Y).

Furthermore, in the present embodiment, although luminance (Y) in the YCbCr color space is given as an example of the feature amount indicative of brightness component, it is not limited to this as long as the feature amount indicates a brightness component. For instance, L (lightness) in the Lab color system defined in JIS (Japanese Industrial Standards) 28729 or the Luv color system defined in JIS 28518 may be used as a feature amount indicative of brightness component. Alternatively, a feature amount indicative of brightness component in various color space, for example, V (value) in the HSV color space, may be used.

Furthermore, in the present embodiment, although a variance value of color difference (Cb) is given as a variance component feature amount indicative of color variance component, it is not limited to this as long as the feature amount indicates a color variance component. For instance, a standard deviation value of color difference (Cb), {maximum value of color difference (Cb)}−(minimum value of color difference (Cb)), a total value of differences with an average value or the like, may be used for a feature amount indicative of color variance component. Moreover, although the present embodiment gives as an example a color difference (Cb) in the YCbCr color space as a feature amount indicative of color variance component, it is not limited to this as long as the feature amount indicates a color variance component. For instance, a feature amount indicative of color variance component in various color space, for example, a color difference (Cr) in the YCbCr color space, H (hue) in the HSV color space or the like, may be used. Still further, although the present embodiment gives as an example a variance value of color difference (Cb) for a variance component feature amount indicative of color variance component, a feature amount indicative of color variance component in a certain threshold region may be used. For instance, a feature amount indicative of color variance component within a certain threshold region, for example, a variance value of color differences (Cb or Cr) in pixels in the neighborhood of the maximum value or minimum value of luminance (Y), may be used.

Still further, although the present embodiment provides as an example an average value of luminance (Y) and a variance value of color difference (Cb) as a combination of feature amounts indicative of brightness component and color variance component, a combination of two or more feature amounts may be used as long as the brightness component and color variance component are at least included. For instance, a luminance (Y) average value, a color difference (Cb) variance value, and a color difference (Cr) variance value may be used as a combination of feature amounts indicative of brightness component and color variance component. Alternatively, a combination of feature amounts may include R, G, and B average values, maximum and minimum values in RGB color space, a saturation (S) average value, maximum and minimum values in HSV color space in addition to the brightness component and color variance component.

The scene determination unit 103 calculates a distance between the value having the combination of feature amounts calculated by the feature amount calculation unit 102 and the representative value having a combination of a plurality of feature amounts indicative of each scene set in advance. Among the calculated distances between the value and representative values, the scene indicating the representative value of the shortest distance is decided to be the scene of the acquired image.

The scene determination control of the scene determination unit 103 is described with reference to FIGS. 6 and 7.

FIG. 6 is a flowchart describing a procedure of the scene determination unit 103 according to the present embodiment.

Figure 7:
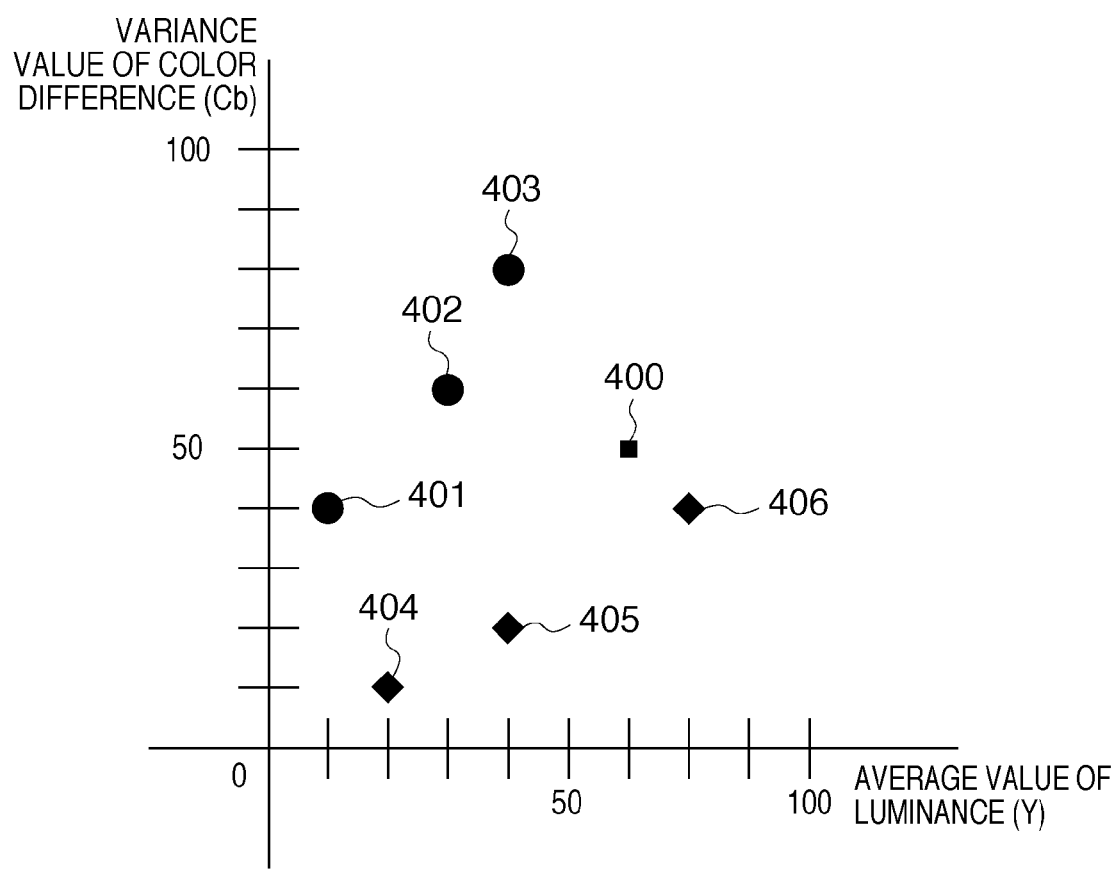
FIG. 7 depicts an explanatory view of a scene determination method according to the embodiment of the present invention.

FIG. 7 depicts an explanatory view of a scene determination method according to the embodiment of the present invention.

FIG. 7 shows a two-dimensional feature-amount space, wherein the abscissa indicates normalized average values of luminance (Y) indicative of brightness components, and the ordinate indicates normalized variance values of color difference (Cb) indicative of color variance components. Numeral 400 denotes coordinates in the two-dimensional feature-amount space, consisting of a normalized luminance (Y)

average value indicative of the brightness component of the acquired image and a normalized color difference (Cb) variance value indicative of the color variance component of the acquired image, which have been calculated by the feature amount calculation unit 102. Numerals 401 to 403 denote coordinates of feature amounts indicative of nightscapes set in advance in the two-dimensional feature-amount space. Numerals 404 to 406 denote coordinates of feature amounts indicative of underexposed images set in advance in the two-dimensional feature-amount space. The coordinates 400 to 406 are shown below.

Coordinates (Xa, Yb)=(luminance (Y) average value, color difference (Cb) variance value)
  coordinates 400 (X0, Y0)=(60, 50)
  coordinates 401 (X1, Y1)=(10, 40)
  coordinates 402 (X2, Y2)=(30, 60)
  coordinates 403 (X3, Y3)=(40, 80)
  coordinates 404 (X4, Y4)=(20, 10)
  coordinates 405 (X5, Y5)=(40, 20)
  coordinates 406 (X6, Y6)=(80, 40)

Referring to FIGS. 6 and 7, in Step S51, based on the value having the combination of feature amounts calculated by the feature amount calculation unit 102 and the representative values each having a combination of a plurality of feature amounts indicative of each scene set in advance, the feature amount of the acquired image is plotted on the feature-amount space coordinate system. For instance, the coordinates 400 are plotted for the value having the combination of feature amounts calculated by the feature amount calculation unit 102, and coordinates 401 to 406 are plotted for representative values each having a combination of a plurality of feature amounts indicative of each scene set in advance. Next in Step S52, a distance is calculated between the value (400) having the combination of feature amounts calculated by the feature amount calculation unit 102 and each of the representative values (401 to 406) each having a combination of a plurality of feature amounts indicative of each scene set in advance. Assuming that the value having the combination of feature amounts calculated by the feature amount calculation unit 102 has coordinates (Xa, Ya), and the representative value having a combination of a plurality of feature amounts indicative of each scene set in advance has coordinates (Xb, Yb), the distance is expressed by the following equation.

$$\text{Distance}=((Xa-Xb)^2+(Ya-Yb)^2)$$

Next in Step S53, it is determined whether or not the processing has been performed for the number of representative values having a combination of a plurality of feature amounts indicative of each scene set in advance. A distance is calculated for each of the representative values having a combination of a plurality of feature amounts indicative of each scene set in advance. For instance, since there are 6 representative values (coordinates 401 to 406) each having a combination of a plurality of feature amounts indicative of each scene set in advance, it is determined whether or not 6 distances have been calculated. The results of distance calculation between the coordinates 400 and each of the coordinates 401 to 406, which have been calculated by the feature amount calculation unit 102, are shown below.

Distance between coordinates 400 (X0,Y0) and coordinates 401 (X1,Y1)=((X0−X1)²+(Y0−Y1)²)=((60−10)²+(50−40)²)=2600

Distance between coordinates 400 (X0,Y0) and coordinates 402 (X2,Y2)=((X0−X2)²+(Y0−Y2)²)=((60−30)²+(50−60)²)=1000

Distance between coordinates 400 (X0,Y0) and coordinates 403 (X3,Y3)=((X0−X3)²+(Y0−Y3)²)=((60−40)²+(50−80)²)=1300

Distance between coordinates 400 (X0,Y0) and coordinates 404 (X4,Y4)=((X0−X4)²+(Y0−Y4)²)=((60−20)²+(50−10)²)=3200

Distance between coordinates 400 (X0,Y0) and coordinates 405 (X5,Y5)=((X0−X5)²+(Y0−Y5)²)=((60−40)²+(50−20)²)=1300

Distance between coordinates 400 (X0,Y0) and coordinates 406 (X6,Y6)=((X0−X6)²+(Y0−Y6)²)=((60−80)²+(50−40)²)=500

Next in Step S54, among the calculated distances between the value having the combination of feature amounts and each of the representative values calculated in Step S52, the representative value of the shortest distance is acquired. For instance, in FIG. 7, since the distance (L6) between coordinates 400 (X0, Y0) and coordinates 406 (X6, Y6) of the feature amount indicative of a scene set in advance is the shortest, the coordinates 406 are acquired as a representative value. Next, in Step S55, the scene set in advance for the representative value of the shortest distance is decided to be the scene of the acquired image. Assuming that the representative value of the coordinates 406 is decided, since the scene set for the coordinates 406 is an underexposed scene, the scene of the acquired image data is also determined to be an underexposed scene.

In the present embodiment, although representative values each having a combination of a plurality of feature amounts indicative of predetermined scene are set in the feature-amount space, the present invention is not limited to this. For instance, five images may be selected respectively for an underexposed image and a nightscape image. A feature amount indicative of brightness component and a feature amount indicative of color variance component are calculated for the total of ten images, and then the calculated values may be set as the representative values of each scene. Alternatively, based on a feature amount of a scene-designated image, a feature amount that can categorize the scene may be calculated by learning. For learning in this case, analysis may be performed on a certain number of sample data groups to extract useful laws, rules, judgment standards and so forth, and the obtained feature amount may be set as a representative value. For a learning method, either one using a Genetic Algorithm (GA) or a Neural Network, which are well-known techniques, may be used. Alternatively, any of the boosting methods, which are the type of machine learning meta-algorithm for performing supervised learning, may be used. Alternatively, any of the principal component analysis, cluster analysis, or Vector Quantization (VQ), which are the type of machine learning meta-algorithm for performing unsupervised learning, may be used.

The correction unit 104 controls correction in accordance with the scene determined by the scene determination unit 103.

Figure 8:
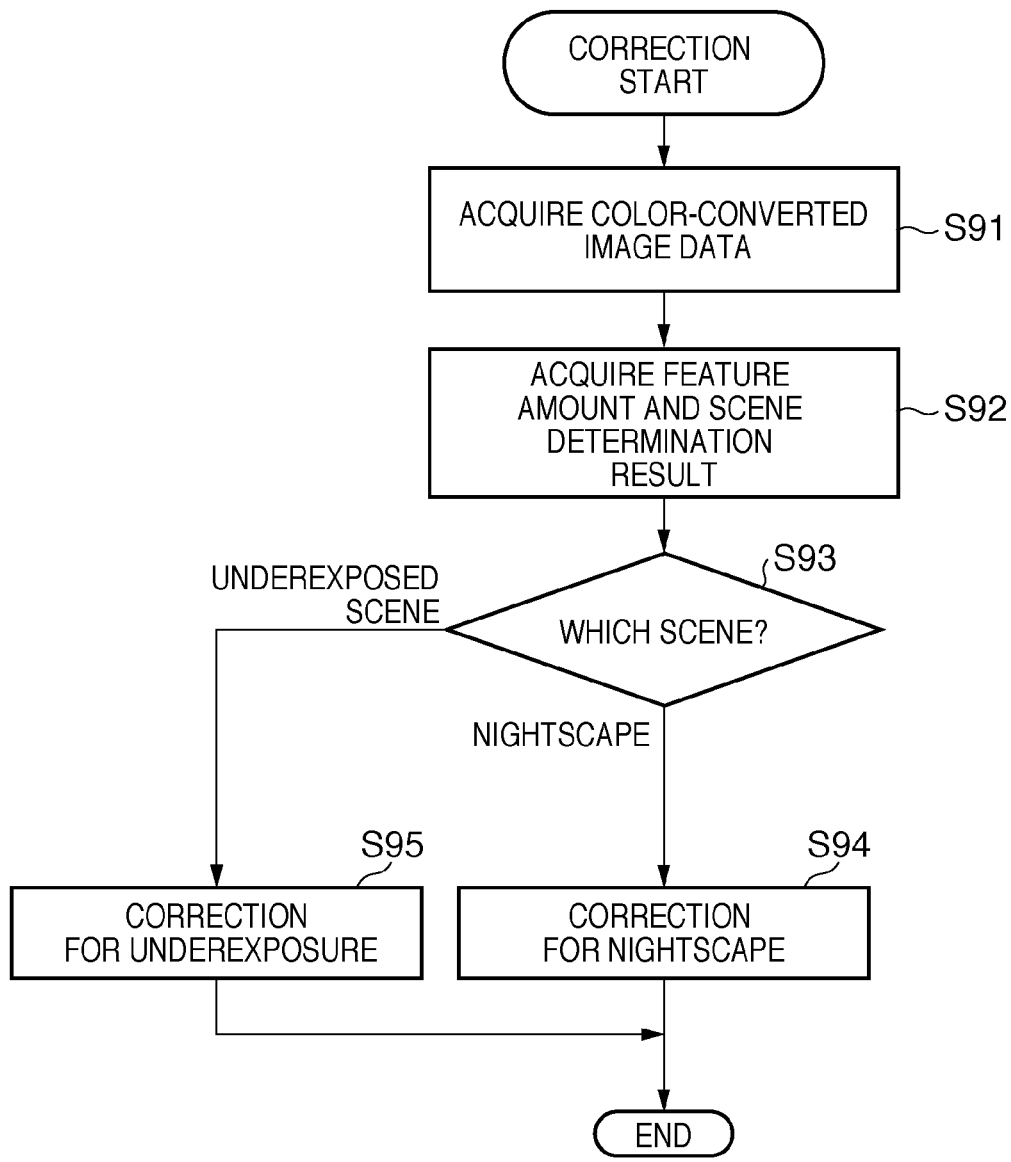
FIG. 8 is a flowchart describing an operation procedure of a correction unit according to the embodiment of the present invention.

FIG. 8 is a flowchart describing an operation procedure of the correction unit 104 according to the embodiment of the present invention.

In Step S91, image data which has been subjected to color-space conversion by the color space conversion unit 101 is input. For instance, image data YCbCr acquired by the image acquisition unit 211 is converted to image data in RGB color space. In Step S92, a feature amount calculation result of the image data calculated by the feature amount calculation unit 102 and a scene determination result of the image data determined by the scene determination unit 103 are acquired. For a feature amount of the image data, for instance, an average value of luminance (Y) is acquired as brightness component. For a scene determination result determined by the scene determination unit 103, an underexposed image or a nightscape image is obtained. Next in Step S93, a scene is determined based on the acquired scene determination result. For instance, whether the scene determination result is an underexposed image or a nightscape image is determined. In accordance with the determination result, control proceeds to Step S94 or S95, and correction is performed on the image data in accordance with the scene determination result. In this embodiment, control proceeds to Step S94 in a case where the scene is determined as a nightscape, and tone correction specialized for a nightscape image is performed. In a case where the scene is determined as an underexposed scene, control proceeds to Step S95 and tone correction specialized for an underexposed image is performed.

Figure 9A:
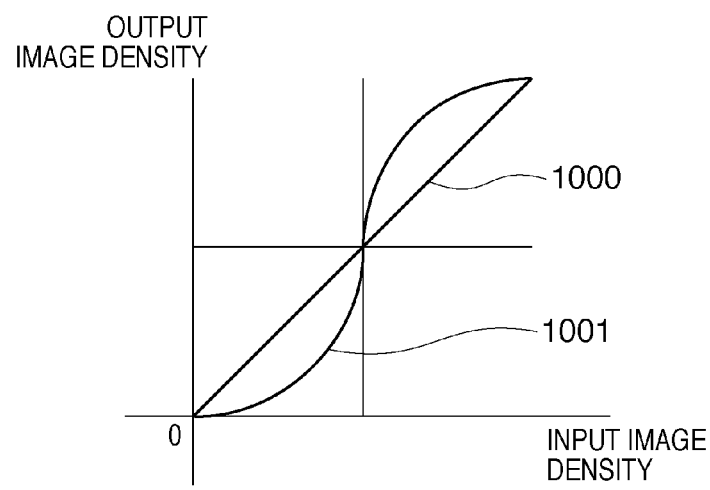
FIGS. 9A to 9C are graphs showing correction γ curves used in an image correction according to the embodiment of the present invention.
Figure 9B:
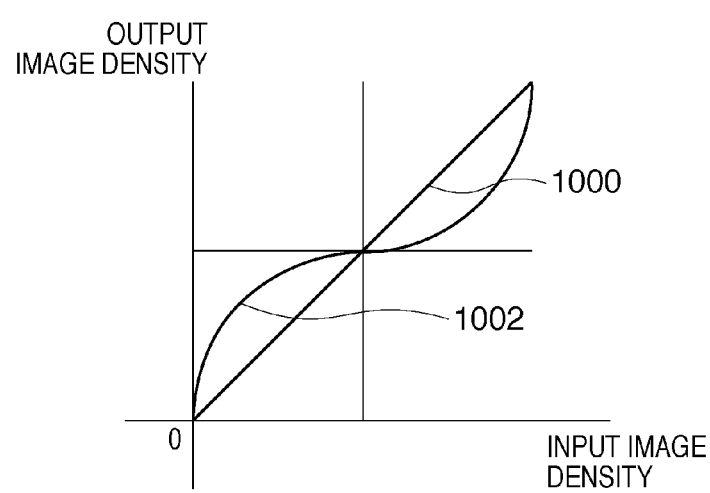
Figure 9C:
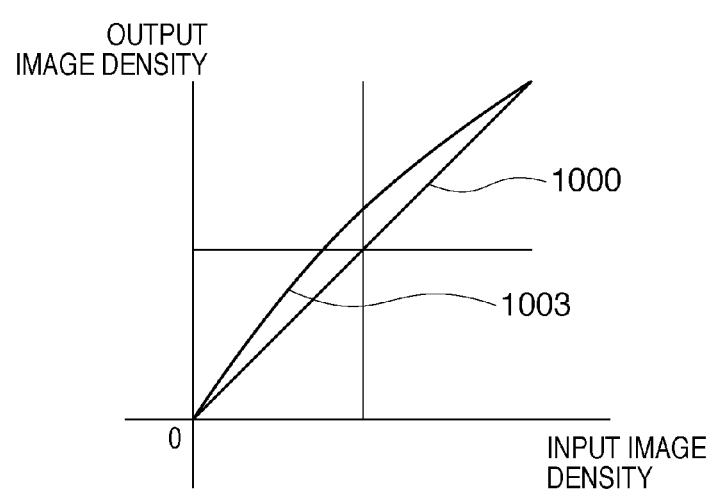

FIGS. 9A to 9C are graphs each showing a γ correction curve used in image correction of the present embodiment.

The straight line 1000 in FIGS. 9A to 9C shows the state in which density of input image data has the same value as density of output image data. The γ correction curve 1001 in FIG. 9A shows the state of performing tone correction in a way that the dark density of input image data is made darker in the output image data while the light density of input image data is made lighter in the output image data.

The γ correction curve 1002 in FIG. 9B shows the state of performing tone correction in a way that the dark density of input image data is made lighter in the output image data while the light density of input image data is made darker in the output image data. The γ correction curve 1003 in FIG. 9C shows the state of performing tone correction in a way that the overall density of output image data is made a little lighter than the input image data density. In FIGS. 9A to 9C, image density of acquired image data is expressed by values 0 to 255 in R, G, and B.

The conversion equations for correction are shown below.

$$R' = 255 \times (R/255)^{1/\gamma}$$

$$G' = 255 \times (G/255)^{1/\gamma}$$

$$B' = 255 \times (B/255)^{1/64}$$

When the γ value is larger than 1, the setting makes an output image lighter than an input image. When the γ value is smaller than 1, the setting makes an output image darker than an input image. In a case where the scene determination result is a nightscape, correction specialized for a nightscape image is performed to make the dark density darker and the light density lighter. To realize this, correction is performed with, for example, γ curve 1001 in FIG. 9A.

Meanwhile, in a case where the scene determination result is an underexposed scene, correction specialized for an underexposed image is performed to make the dark density lighter and the light density darker. To realize this, correction is performed with, for example, γ curve 1002 in FIG. 9B. The γ value of the γ correction curve is decided based on the feature amount of acquired image data. For instance, it is decided based on an average value of luminance (Y) as brightness component.

Although the γ correction curve in FIG. 9A is selected for a nightscape and the γ correction curve in FIG. 9B is selected for an underexposed image in the present embodiment, other γ correction curves different from the present embodiment may be selected. For instance, if the scene determination result is an underexposed image, correction is performed in a way that the entire image becomes lighter. In this case, correction may be performed with, for example, the γ curve 1003 in FIG. 9C.

Note that, although in the present embodiment the γ value of the γ correction curve is decided based on the average value of luminance (Y) as brightness component, the present invention is not limited to this as long as one of the calculated feature amounts of the image data is used. For instance, as the feature amount of acquired image data, a γ value may be decided based on the color difference (Cb) variance value which is a color variance component. Furthermore, although in the present embodiment tone correction shown in FIGS. 9A to 9C is performed, any known correction processing may be used as long as the correction is performed with the use of at least the scene determination result. For instance, in a case where the scene determination result is a nightscape, correction may be performed for increasing the saturation having a high luminance value.

Furthermore, although the present embodiment gives an example of performing correction on image data to be printed with the use of the scene determination result, the present invention is not limited to this as long as an apparatus and method determines the scene and utilizes the scene determination result. For instance, in taking a photograph with a digital camera, a scene may be determined and the determined result may be used for performing various control in the photography, for example, amount of exposure, photography mode, and so on. For instance, in displaying images that are laid out, scenes may be determined for sorting the images according to the determined scenes, and the determined result may be used for the layout of the images.

As has been set forth above, according to the present embodiment, a nightscape and an underexposed image can be determined by classifying scenes with the use of values having a combination of feature amounts indicative of brightness component and color variance component.

The main part of the present embodiment is briefly stated below. More specifically, a file including image data is acquired by an image acquisition unit. From the acquired file, image data and attribute information such as an image size are obtained. The acquired image data is converted to necessary color space. The color-space-converted image data is analyzed, and a feature amount indicative of brightness component and a feature amount indicative of color variance component which are used for scene determination are calculated and set as the representative value. The scene of the image data is determined based on a distance between the calculated representative value and a representative value of a predetermined scene. Depending on the scene determination result, correction control is performed. Then, the corrected image is printed on a print medium by a printer. This is the description of the present embodiment.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-098489, filed Apr. 14, 2009, which is hereby incorporated by reference herein in its entirety.

What is claimed is:

1. An image processing apparatus comprising:
an obtaining unit configured to obtain a brightness component and a color variance component of image data; and
a determination unit configured to determine whether the image data is nightscape image data or underexposed image data, using at least the brightness component and the color variance component obtained by the obtaining unit;
wherein the determination unit compares the brightness component and the color variance component obtained by the obtaining unit with a plurality of predetermined brightness components and predetermined color variance components and makes a determination based on a result of the comparison.

2. The image processing apparatus according to claim 1, wherein the determination unit calculates a distance between coordinates of the brightness component and the color variance component obtained by the obtaining unit and coordinates of a brightness component and a color variance component of a nightscape image and an underexposed image, in a coordinate system of at least the brightness component and the color variance component, and
determines whether the image data is nightscape image data or underexposed image data based on which image corresponds to a shortest distance.

3. The image processing apparatus according to claim 1, further comprising a correction unit configured to correct the image data based on a result obtained by the determination unit.

4. The image processing apparatus according to claim 3, wherein in a case where the determination unit determines that the image data is nightscape image data, the correction unit makes correction so as to increase saturation of pixels having a high luminance density value of the image data, and
in a case where the determination unit determines that the image data is underexposed image data, the correction unit makes correction so as to make pixels of the image data lighter.

5. The image processing apparatus according to claim 1, wherein the brightness component is a luminance of pixels of the image data, and the color variance component is a color difference of pixels of the image data.

6. The image processing apparatus according to claim 1, wherein the brightness component is any of an average value of luminance of pixels of the image data, a maximum value of luminance of pixels of the image data, a minimum value of luminance of pixels of the image data, and a median value of luminance of pixels of the image data.

7. The image processing apparatus according to claim 1, wherein the color variance component is any of a variance value of color difference of pixels of the image data, a value obtained by subtracting a minimum value of color difference from a maximum value of color difference of pixels of the image data, a variance value of color difference of pixels in the neighborhood of a pixel having a maximum value of luminance of pixels of the image data, and a variance value of color difference of pixels in the neighborhood of a pixel having a minimum value of luminance of pixels of the image data.

8. A method for controlling an image processing apparatus, comprising the steps of:
obtaining a brightness component and a color variance component of image data; and
determining whether the image data is nightscape image data or underexposed image data, using at least the brightness component and the color variance component obtained in the obtaining step,
wherein the determining step compares the brightness component and the color variance component obtained in the obtaining unit with a plurality of predetermined brightness components and predetermined color variance components and makes a determination based on a result of the comparison, and
wherein at least one of the steps is executed by a computer.

9. A non-transitory computer-readable storage medium storing an executable program for causing a computer to function as an image processing apparatus according to claim 1.

10. The image processing apparatus according to claim 1, wherein the brightness component is the Y component in a YCbCr color space, the L component in a Lab color system, the L component in a Luv color system, or the V component in a HSV color space.

11. The image processing apparatus according to claim 1, wherein the color variance component is the Cb component in a YCbCr color space, or the Cr component in a YCbCr color-space.

12. The image processing apparatus according to claim 3, wherein in a case where the determination unit determines that the image data is nightscape image data, the correction unit makes correction in a way that dark pixels of the image data are made darker and light pixels of the image data are made lighter, and
in a case where the determination unit determines that the image data is underexposed image data, the correction unit makes correction in a way that dark pixels of the image data are made lighter and light pixels of the image data are made darker.

13. The image processing apparatus according to claim 1, wherein the plurality of predetermined brightness components and the predetermined color variance components are respectively a brightness component and color variance component indicative of a night image and a brightness component and color variance component indicative of an underexposed image.

14. The image processing apparatus according to claim 1, wherein the determination unit determines based on a relation of coordinates indicating the brightness component and the color variance component obtained by the obtaining unit, coordinates indicating a predetermined brightness component and a predetermined color variance component indicative of night image, and coordinates indicating a predetermined brightness component and a predetermined color variance component indicative of underexposed image, in a feature amount space including least a brightness component and a color variance component.

* * * * *